July 6, 1965 N. E. KERRIDGE 3,193,109
SLEWING AND ERECTING MOTOR FOR TOWER CRANES
Filed July 26, 1963 6 Sheets-Sheet 1

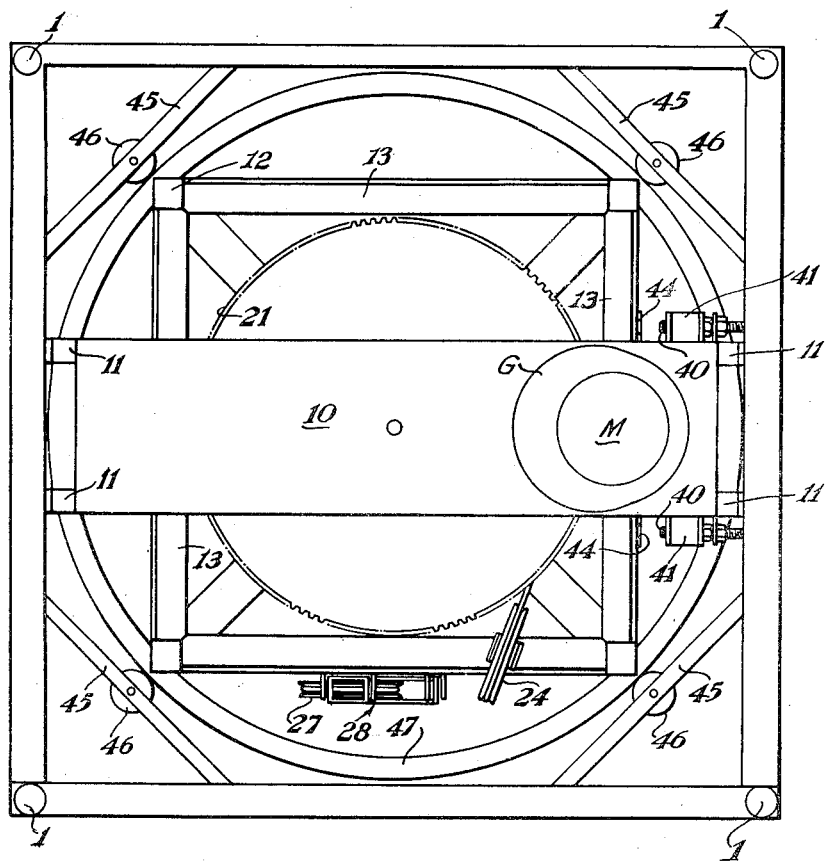
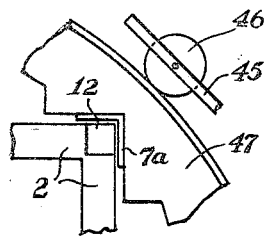
Fig. 3.
Fig. 3a

July 6, 1965   N. E. KERRIDGE   3,193,109
SLEWING AND ERECTING MOTOR FOR TOWER CRANES
Filed July 26, 1963   6 Sheets-Sheet 4

Inventor.
Norman Edward Kerridge
By Baldwin & Hight
attorneys

July 6, 1965   N. E. KERRIDGE   3,193,109
SLEWING AND ERECTING MOTOR FOR TOWER CRANES
Filed July 26, 1963   6 Sheets-Sheet 5

July 6, 1965 N. E. KERRIDGE 3,193,109
SLEWING AND ERECTING MOTOR FOR TOWER CRANES
Filed July 26, 1963 6 Sheets-Sheet 6

United States Patent Office 3,193,109
Patented July 6, 1965

3,193,109
SLEWING AND ERECTING MOTOR FOR TOWER CRANES
Norman Edward Kerridge, Saltford, near Bristol, England, assignor to Stothert & Pitt, Limited, Bath, England, a company of the United Kingdom
Filed July 26, 1963, Ser. No. 297,796
Claims priority, application Great Britain, July 31, 1962, 29,466/62
6 Claims. (Cl. 212—68)

This invention comprises a tower crane having a tower which is self-erecting.

More particularly the present invention is concerned with a tower crane wherein the tower is made up of standard sections and which, when erected, supports at its upper ends a jib and counterjib for slewing movements, the jib and its counterjib being carried by a superstructure mounted on a pintle at the top of the tower.

Existing builders' tower cranes generally use one motor for the hoist, one for the slew, one for trolley travel, and an additional motor for climbing, i.e. during erection of the sections or when extending the tower.

During climbing, slewing motion is unnecessary and the present invention is concerned with a drive mechanism making use of rope climbing, which enables the slew motor and its transmission to be used for winding in or paying out the rope, thereby dispensing with the necessity of a second motor.

According to the present invention, a drive mechanism for a self-erecting tower crane, having a tower built up of sections and supporting a superstructure with a jib, comprises a yoke member, adapted when the tower is erected for connection to the superstructure, a winch drum rotatable about a pintle attached to the tower or yoke, a drive motor and associated gearing by which drive is transmitted to the drum and means for locking the yoke and the superstructure to the tower when rotation of the drum is required for climbing, erection or extension purposes, and for locking the winch drum to the tower to enable the yoke member with the superstructure to be revolved about the tower for the purpose of slewing.

The invention is illustrated by way of example in the accompanying drawings, in which:

FIGURE 3 is a plan view of the arrangement of FIGURE 2;

FIGURE 3a is a detailed view showing the arrangement of a circular trackway member and associated elements;

Figure 1:
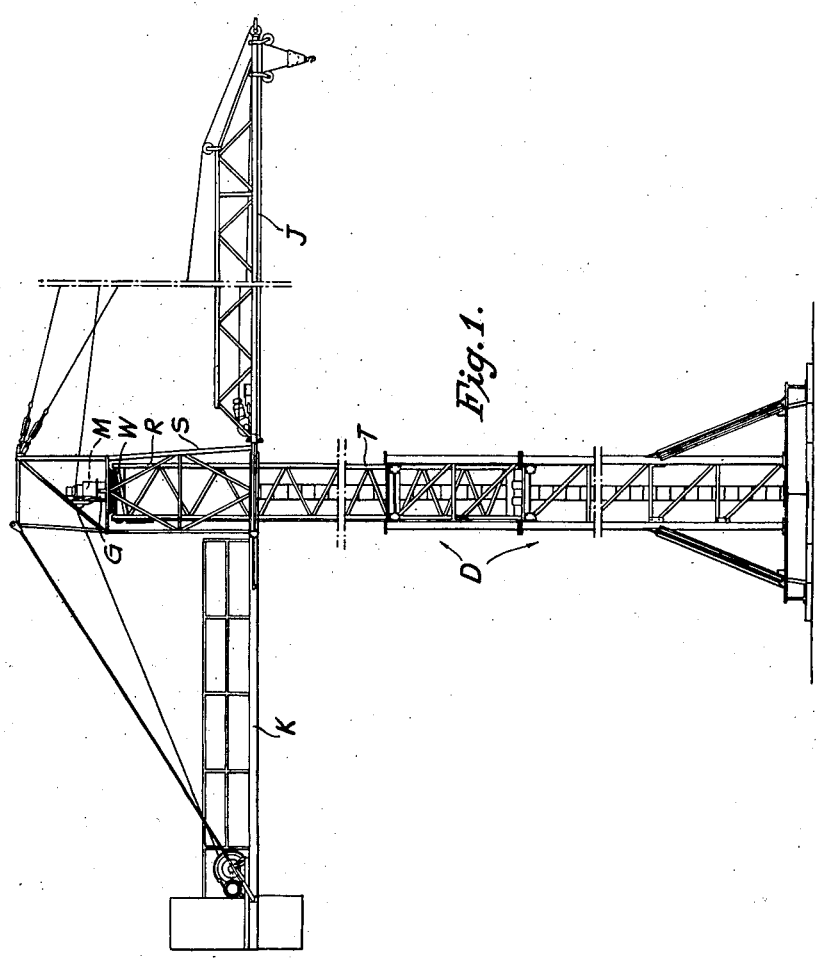
FIGURE 1 is an elevation of a builder's telescopic crane showing the inner and outer towers, superstructure with a jib and counterjib, and a single drive motor.
Figure 5:
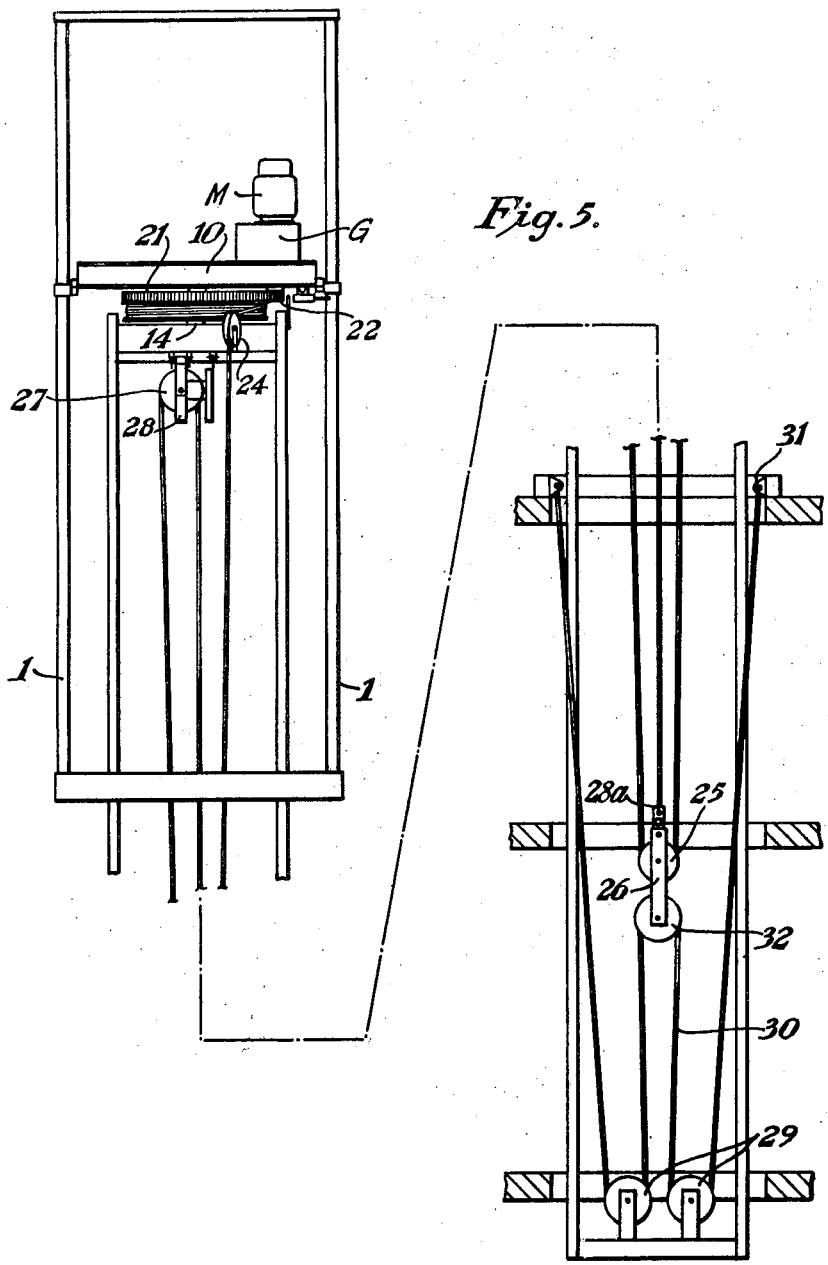
FIGURE 5 shows the superstructure in position and attached to the yoke with the winch drum used for climbing.

In the drawings the main or inner tower hereinafter referred to as the tower is indicated generally at T, the outer tower within which the inner tower telescopes, being made up of independent sections D (FIGURE 1). R is the upper section of the tower T, on which is mounted a motor M, and associated gears G. J is the jib and K the counterjib, which are attached to the base of a framework, termed the superstructure S. The provision of an outer tower is entirely optional and would in practice only be required when a particularly high tower is necessary. The mono-tower can either be free-standing, supported externally of a building, or as shown in FIGURE 5 arranged to rise through a building under construction.

The method of erection of the tower and the superstructure S is the subject of our co-pending application No. 297,795. As described in that specification, the superstructure S remains at ground level until erection of the tower T is complete, and the several sections, of which the tower is made up, have been moved into position through one side of the superstructure, in which is an opening for this purpose, the single motor M and its winch drum indicated at W, serving as the means of raising the tower stage by stage as the individual sections are added.

Figure 2:
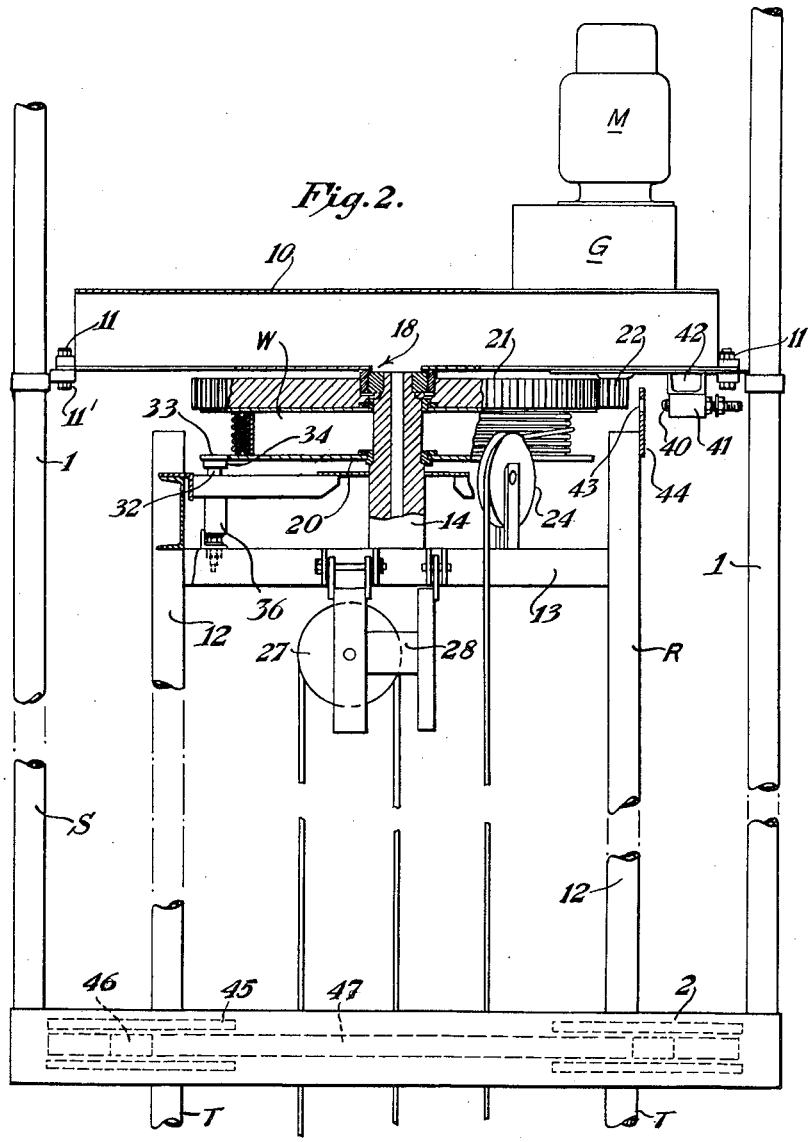
FIGURE 2 is an elevation on an enlarged scale of part of the (inner) tower and superstructure (the jib being omitted) looking from that side of the superstructure to which the counterjib is attached, showing the drive motor and gears carried by a yoke and the associated winch drum.
Figure 4:
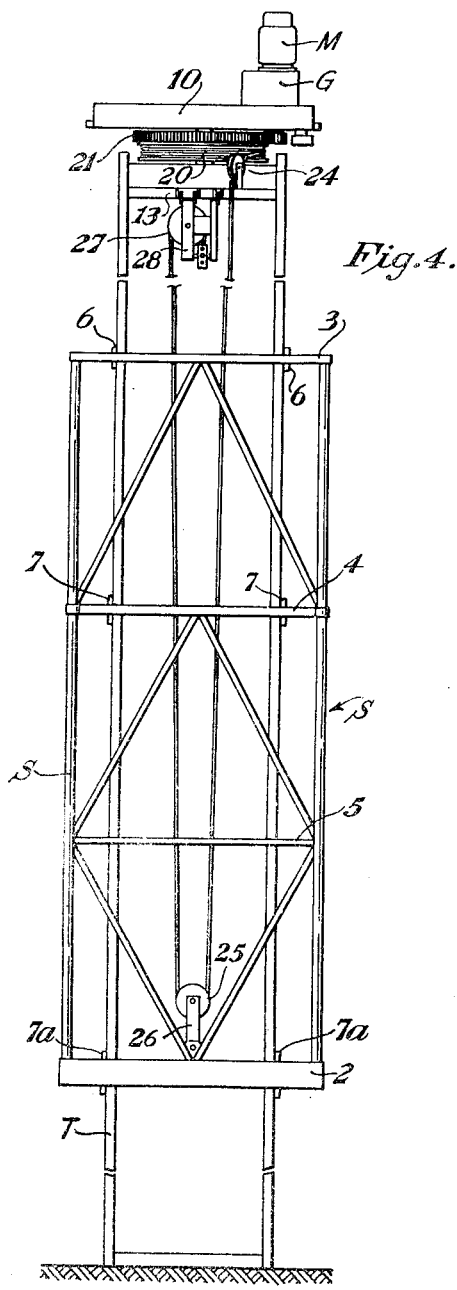
FIGURE 4 is a view showing the winch drum in operation when hoisting the superstructure into position (the jib and counterjib being omitted) prior to securing it to the yoke.

Referring now to FIGURES 2, 3 and 4 the superstructure which takes the form of a three-sided cage, the fourth side being provided by a detachable panel or panels, has uprights or verticals 1, there being one at each corner connected at their lower ends to a base frame made up of laterals 2. At their upper ends the verticals 1 are connected by similar laterals 3 with intermediate laterals 4 and 5. During erection of the tower, the cage serves as a means for guiding the tower, as it is built up section by section, guides being indicated at 6 and 7. Additional guides 7a are supported by the laterals 2 for guiding the superstructure up the tower when erection of the latter is complete.

The drive mechanism of this invention utilizes a beam 10 hereinafter described as a yoke (FIGURE 2), being provided at its four corners with attaching brackets 11, by which it is secured, when erection of the tower is complete, to the superstructure, corresponding brackets 11' (FIGURE 2) being provided for the same purpose on the superstructure S.

The pintle or upper section R of the tower similarly comprises corner uprights 12 joined to each other at their upper ends by laterals 13, forming part of the framework on which is fixedly supported centrally a shaft or spindle 14, constituting the pintle.

The yoke 10 is rotatably mounted on the upper end of the pintle by means of a bearing 18, beneath which is a second bearing for a winch drum 20, which is also capable of rotation on the pintle. 21 is a spur wheel fast with the winch drum 20; in constant mesh with the spur wheel 21 is a pinion 22 on the output shaft of the reduction gear G driven from the motor M.

For the purpose of hoisting the superstructure up the tower, the rope from the drum 20 passed over a guide sheave 24 to a sheave 25 on a sheave block 26 (FIGURE 4) anchored to the bottom of the superstructure, whence it passes up to a second guide sheave 27 carried by a two-armed bracket 28 pivotally connected the the framework or platform 13, the free end of the rope being attached to a clamping bracket 28a.

By attaching the clamping bracket 28a to a part of the tower i.e. anchoring the end of the rope when the winch is turned to wind in the rope it will lift the superstructure which can then be raised to the top of the tower. When, however, it is desired to climb the inner tower T within the outer tower or to climb the inner tower through a building the same reeving is used but it is only necessary to change the anchorage for the free end of the rope.

This operation is described in FIGURE 5 in relation to climbing the tower through a building. A climbing rope, indicated at 30, is anchored at each end as at 31 to one of the floors of the building, and after passing around a pair of guide pulleys 29 at the bottom of the tower is looped over a sheave 32 attached to a sheave block 26. Obviously, coiling in of the rope on the drum will cause the tower to slide up through the apertures in the floors of the building.

Provision is made for locking the drum 20 and its spur wheel 21 to the tower, and for this purpose there is provided a pin 32 (FIGURE 2) mounted in a guide 36, the pin 32 being movable into and out of engagement with a hole 33 in a block 34 on the underside of the drum 20.

It will be clear that when the pin 32 has been operated to lock the drum and spur wheel 21 to the tower, the spur wheel 21 will operate as a rack, with the result that when the motor M is started up, the superstructure which is free to revolve about the pintle, can be slewed by pinion 22 driving on the rack.

Slewing of the superstructure and jib can now be performed in either direction by starting the motor, which is reversible, in the appropriate direction.

Provision is also made for locking the yoke 10 to the tower T, which is done by means of a second lock comprising pins 40 mounted in guides 41 carried by a bracket 42 on the underside of the yoke member 10 engaging holes 43 formed in a bracket 44 on the upper section R of the tower.

Therefore, when it is desired to utilize the winch rope i.e. during erection or when climbing, in order to impart drive to the drum, the interlock between the drum and tower is releasde i.e. the pin 32 is withdrawn from hole 33 and the pins 40 engaged in the holes 43 to lock the yoke to the tower. Starting the reversible motor now rotates the drum in either direction, in order to pay in or pay out rope.

When the crane is used as a telescopic tower crane the same hoisting gear is used as described above to slide the inner tower up the outer tower. When erecting the crane the same method of operation, but with different rope reeving is used to erect the inner tower and also to elevate it for the insertion of additional sections on the bottom as described in our co-pending application No. 297,795.

At its lower end the superstructure is provided with corner diagonals 45, mounting rollers 46 for engagement with a roller track formed on a circular cage 47, supported by the uprights 12 of the tower section. The uprights 12 do not pass through the circular roller path. This unit is located and held captive by the rollers 46 on the superstructure frame, the guides 7a being provided between the tower uprights and the roller path as shown in FIGURE 3a.

It should be understood that the outer tower made up of sections D is only shown in FIGURE 1 for completeness and forms no part of the present invention. The outer tower is only concerned in that the windlass, through the winch rope, is used as a means of climbing the tower T proper up the outer tower which is one of its duties.

In the embodiment described in FIGURES 1-5 the pintle 14 is fixed to the tower section and provides bearings both for the yoke 10 and winch drum 20.

Figure 6:
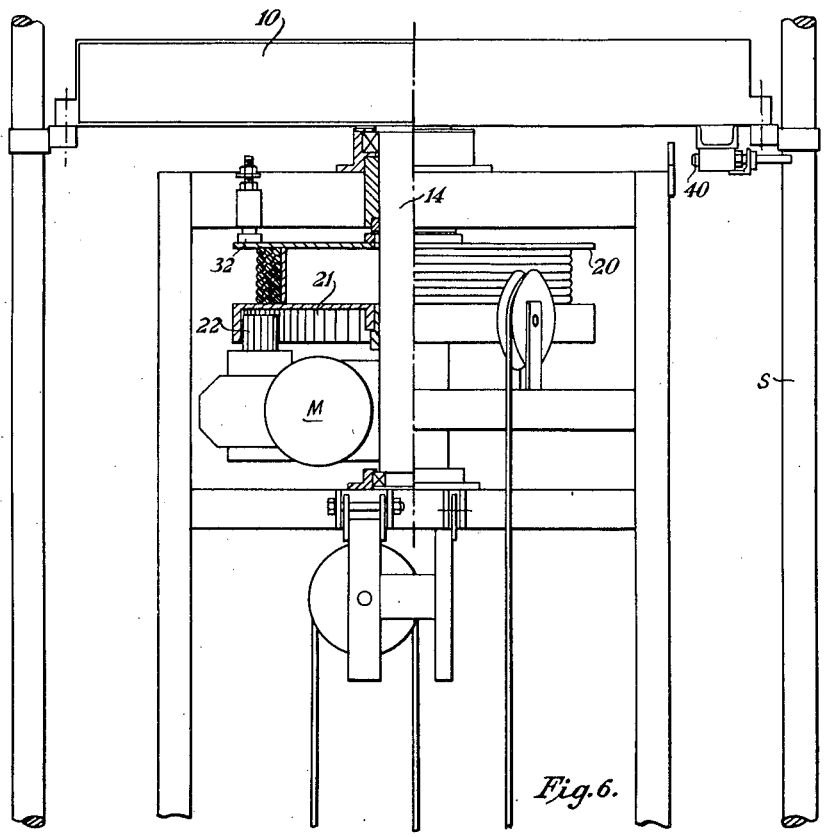
FIGURE 6 is a view similar to that of FIGURE 2 but illustrating an alternative arrangement for the mounting of the drive motor and gears.

FIGURE 6 illustrates an alternative arrangement of the winch-drum-slewing mechanism, wherein the pintle 14 is rotatably mounted relative to the tower but the yoke 10 is attached to, i.e. fast with the pintle 14 which also carries the drive mechanism M. The mechanism M which is housed within the tower will rotate with the yoke. Mechanism M includes a pinion 22' meshing with teeth 27' on the inside of a flange integral with the lower flange plate of the winch drum.

As previously described in connection with FIGURES 2-5, locking bolts 40 and 32 are provided between the tower and the yoke and between the tower and the winch drum respectively. For the purpose of slewing bolts 32 are engaged and bolts 40 withdrawn so that the winch drum 20 is locked to the tower and the superstructure S is free to move relative to the tower in response to rotation of the pinion 22' driving on the rack teeth 21'.

When the position of the bolts is reversed, i.e. bolts 40 engaged and bolts 32 withdrawn, the yoke 10 is locked to the tower and the winch may be used for climbing in the manner previously described.

What is claimed is:

1. In a self-erecting tower crane, in combination with a tower which is built up in sections, a superstructure rotatably supported from the tower, a yoke member on the tower and adapted for connection to the superstructure, a jib carried by the superstructure, and means for imparting slewing motions to the jib, said means comprising a winch drum mounted to revolve about an axis concentric with the slewing axis of the superstructure, a motor and associated gearing for transmitting drive to the drum and to the yoke and superstructure, a rope and pulley system connected to said winch drum for erecting the tower and thereafter raising the superstructure and jib, means for locking the yoke member to the tower when rotation of the drum is required for operation of said rope-pulley system, and means for locking the winch drum to the tower when rotary motion of the yoke is required to enable the superstructure to be slewed relative to the tower.

2. A drive mechanism for a self-erecting tower crane having a tower built up of sections, supporting a superstructure with a jib, and wherein said tower is provided with a rope and pulley system permitting self-erection of the tower and superstructure and climbing of the tower with respect to a supporting structure, said mechanism comprising a yoke member, means for connecting the yoke member to the superstructure, a pintle shaft supported by said tower, a winch drum rotatable about said pintle shaft and connected to said rope and pulley system, a drive motor, means for transmitting drive from said motor to said winch drum, means for locking said yoke member to the tower when rotation of the winch drum is required to operate said rope and pulley system, and means for locking the winch drum to the tower to enable the yoke member with the superstructure to be revolved about the tower for the purpose of slewing.

3. A drive mechanism according to claim 2 in which said pintle shaft is attached fast to said tower, said yoke member being mounted for rotation on said pintle shaft and providing a support for said drive motor and said drive transmitting means.

4. A drive mechanism according to claim 3 in which said drive transmitting means comprises an external-toothed spur wheel, fast with the winch drum and the pinion driven by the motor, said spur wheel and pinion being in constant mesh.

5. A drive mechanism according to claim 2 and further comprising a pintle bearing mounted in said tower, said pintle shaft being attached fast with said yoke member and supported by said pintle bearing for rotation therein, said drive motor and said drive transmitting means being mounted on said pintle shaft for rotation therewith.

6. A drive mechanism according to claim 5 in which said drive transmitting means comprises an internal-toothed spur wheel fast with the winch drum and a pinion driven by the motor, said spur wheel and pinion being in constant mesh.

References Cited by the Examiner

UNITED STATES PATENTS

| | | | |
|---|---|---|---|
| 2,858,945 | 11/58 | Pingon | 212—64 |
| 3,106,299 | 10/63 | Pingon | 212—64 |
| 3,127,996 | 4/64 | Schwing | 212—57 |

SAMUEL F. COLEMAN, *Primary Examiner.*

ANDRES H. NIELSEN, *Examiner.*